(12) United States Patent
Allam

(10) Patent No.: US 9,035,819 B2
(45) Date of Patent: May 19, 2015

(54) AIR DEFENSE SYSTEM ARCHITECTURE COMBINING PASSIVE RADARS AND ACTIVE RADARS

(75) Inventor: Sébastien Allam, Antony (FR)

(73) Assignee: Thales, Neuilly-sur-Seine (FR)

( * ) Notice: Subject to any disclaimer, the term of this patent is extended or adjusted under 35 U.S.C. 154(b) by 555 days.

(21) Appl. No.: 13/503,039

(22) PCT Filed: Oct. 25, 2010

(86) PCT No.: PCT/EP2010/066076
§ 371 (c)(1),
(2), (4) Date: Apr. 20, 2012

(87) PCT Pub. No.: WO2011/048225
PCT Pub. Date: Apr. 28, 2011

(65) Prior Publication Data
US 2012/0206289 A1    Aug. 16, 2012

(30) Foreign Application Priority Data
Oct. 23, 2009  (FR) ...................................... 09 05113

(51) Int. Cl.
*G01S 13/87*     (2006.01)
*G01S 13/00*     (2006.01)
*G01S 13/02*     (2006.01)

(52) U.S. Cl.
CPC ............... *G01S 13/87* (2013.01); *G01S 13/003* (2013.01); *G01S 13/878* (2013.01); *G01S 2013/0272* (2013.01)

(58) Field of Classification Search
CPC ...... G01S 13/87; G01S 13/878; G01S 13/003; G01S 2013/0272; G01S 3/30; G01S 13/88; G01S 13/765; G01S 13/78
USPC .................................. 342/95, 96, 97, 195, 59
See application file for complete search history.

(56) References Cited

U.S. PATENT DOCUMENTS 6,424,290 B1 *   7/2002   O'Neil et al. ................... 342/55
2008/0088508 A1 *   4/2008   Smith ........................... 342/453

FOREIGN PATENT DOCUMENTS

EP         1942351        7/2008
FR         2909773        6/2008

OTHER PUBLICATIONS

A.G. Huizing and A.A.F. Bloemen, "An efficient scheduling algorithm for a multifunction radar," in Proc. IEEE Int. Symp. Phased Array Systems Technology,Oct. 15-18, 1996, pp. 359-364.*
International Search Report for PCT/EP2010/066076 dated Apr. 2, 2011.

* cited by examiner

*Primary Examiner* — John B Sotomayor
(74) *Attorney, Agent, or Firm* — Snell & Wilmer L.L.P.

(57) ABSTRACT

The architecture includes a passive radar using opportunistic transmitters and a plurality of active radars that cooperate in the form of a coalition to assure the surveillance of an area of space. The passive radar and the active radars that form the architecture include means for exchanging information and the passive radar is configured to adopt two alternate operating modes: (i) a "watching" mode in which the passive radar carries out surveillance of the area of space concerned and generates detection information, and (ii) an "on-demand data feed" mode in which the passive radar executes at the request of one or more active radars an object search in a given sector of the area under surveillance or an analysis of certain characteristics of the signal received in a given sector.

20 Claims, 2 Drawing Sheets

AIR DEFENSE SYSTEM ARCHITECTURE COMBINING PASSIVE RADARS AND ACTIVE RADARS

CROSS-REFERENCE TO RELATED APPLICATIONS

This application is a U.S. national phase filing under 35 U.S.C. §371 of PCT/EP2010/066076 filed Oct. 25 2010, which application claims priority to and the benefit of French Application No. 0905113 filed on Oct. 23, 2009. The entire contents of both of the aforementioned application is incorporated herein by reference.

FIELD

The invention relates to the field of radar detection. It concerns more particularly radar networks implemented to provide radar coverage of a given area.

BACKGROUND

The use of multifunction active radar to provide coverage of an area in space generally leads to attempting to determine how to chain the various tasks carried out by the radar or radars responsible for covering that area, namely panoramic watching tasks, target detection confirmation tasks, and specific detected target parameter analysis (tracking) tasks. Carrying out the various tasks generally leads to arbitration which, depending on circumstances, the number of targets detected, is carried out to the detriment of one or the other tasks as a function of the degree of priority of each of them. Accordingly, in a dense environment, watching tasks are often spaced in time to favor the execution of a confirmation or tracking task. Likewise, watching tasks programmed for a given time given the direction in which the radar is pointed may be purely and simply eliminated for lack of time. However, in such a context, the multiplication of active radar equipments to monitor the same area, or to be more accurate different sectors of the same area, apart from the fact that it constitutes a costly solution, is not always satisfactory, given that in such an arrangement each radar equipment continues to function autonomously, which generally fails to take account of the global situation, which is generally processed offline by a command center that merges data transmitted by the various radars.

SUMMARY

One object of the invention is to propose a solution enabling the full benefit to be obtained of the association of a plurality of active radars with one or more passive radars to effect a surveillance/defense mission for a given area in space.

To this end, the invention provides a radar surveillance system of the type including a passive radar using opportunistic transmitters and a plurality of active radars that cooperate in the form of a coalition to assure the surveillance of an area of space, the passive radar and the active radars including means for exchanging information. The passive radar is configured to adopt two alternate operating modes:

a "watching" mode in which the passive radar carries out surveillance of the area of space concerned and generates detection information relating to objects in the area under surveillance, and an "on-demand data feed" mode in which the passive radar executes at the request of one or more active radars an object search in a given sector of the area under surveillance or an analysis of certain characteristics of the signal received in a given sector defined by distance, speed and azimuth values, the data generated by the passive radar following a request being transmitted to the active radar or radars authoring that request.

According to the invention the passive radar includes means configured to manage the use over time of the two alternate operating modes, the change from the "watching" mode to the "on-demand data feed" mode being induced by the transmission of a data request by one of the active radars and by the nature and the degree of priority of the request sent, the "watching" mode constituting the default operating mode of the passive radar in the absence of any request.

In a preferred embodiment the system of the invention includes means for optimal temporal scheduling of operations corresponding to requests transmitted by the active radars.

In a preferred embodiment of the system of the invention each active radar includes means for determining, given the optimum time for execution of the task that is the subject of a request transmitted to the passive radar, the duration of the necessary notice that must accompany the transmission of the request so that the passive radar is able to execute the requested task at the optimum time. The duration of the notice takes into account the time necessary for transmitting the request given the nature of the communication means that link the passive radar to the active radars.

In a preferred embodiment of the system of the invention all radars forming the system includes means for taking into account a date and time and a time reference that are common.

In a preferred embodiment of the system of the invention the requests transmitted by an active radar are of two types:

search requests, requesting a search by the passive radar for new targets in a given sector satisfying given position and speed criteria, and analysis requests, requesting measurement by the passive radar of particular magnitudes in a restricted spatial domain defined by a central position accompanied by the uncertainty on that position, as well as by an extent in the various directions in space;

the requests transmitted being accompanied by the time for which the requested task must be carried out.

In a preferred embodiment of the system of the invention the passive radar is configured, when operating in the "watching" mode, to transmit to the active radars of the coalition information generated from its detections.

Thanks to the use of the architecture of the invention, each of the active radars associated to cover an area in space may have access to complementary information supplied by one or more passive radars, enabling it to carry out its mission better.

The features and advantages of the invention will be better appreciated thanks to the following description, which discloses the invention via a particular embodiment taken by way of nonlimiting example and refers to the appended figures.

DESCRIPTION OF THE VARIOUS EMBODIMENTS

The idea on which the invention is based consists in improving the performance of a network of active radars by adding passive sensors employing continuous opportunistic transmission (CW) such as radio broadcast transmissions. According to the invention, a passive radar is added to a set of active radars and is configured to provide effective support to their mission of surveillance/defense in an area of space for which they are responsible. Adding a passive radar to a set of active radars is intended either to provide additional coverage of the area concerned or, more advantageously, to reinforce the coverage.

Figure 1:
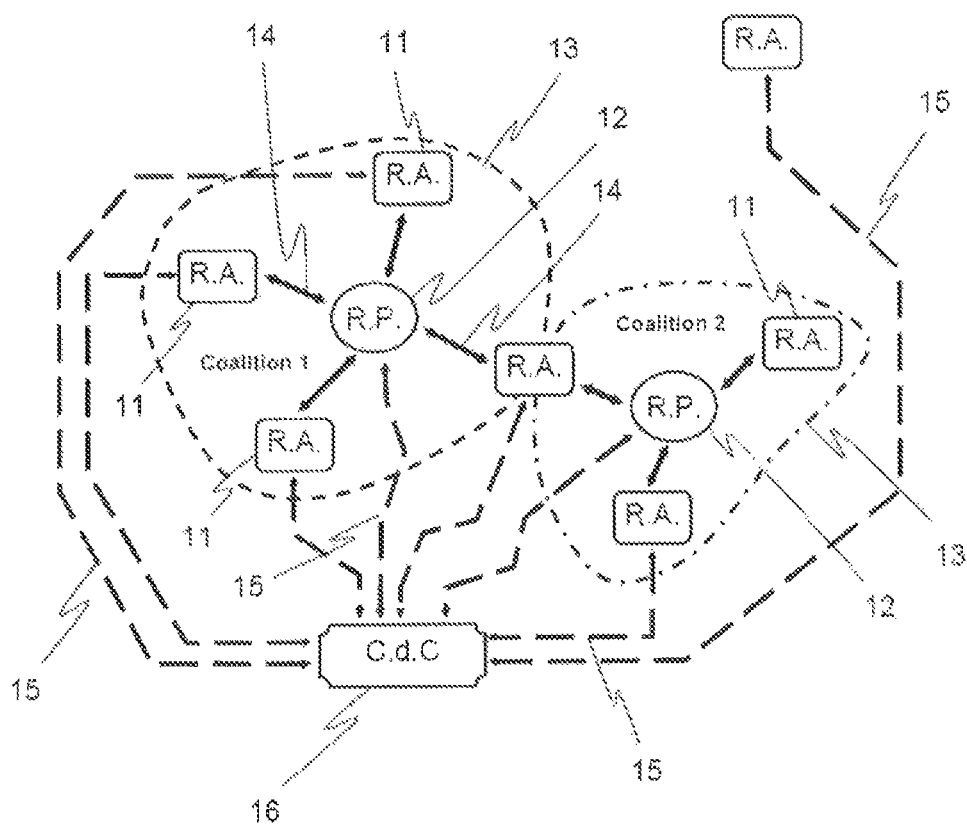
FIG. 1 is a block diagram representing a system employing the architecture of the invention.

According to the invention the active radars 11 (R.A.) that form the network intended to cover the area concerned are, as shown in FIG. 1, associated in groups, each group being itself associated with a passive radar 12 (R.P.) and forming with it a coalition 13, i.e. a set of radars sharing the same coverage objective. In a coalition 13, the passive radar 12 has a separate direct connection 14 to each of the active radars 11 of the coalition. This connection is represented by solid line arrows in FIG. 1. There is also a connection 15 with the command center (CdC) 16, which manages one or more given coalitions 13. It is moreover normally located at a carefully chosen place different from the locations of the other radars.

The architecture of the invention is generally characterized by a particular set of exchanges between the passive radar and the active radars of the coalition to which it belongs. To this end each active radar includes connecting means enabling it to communicate with the passive radar. Conversely, the passive radar includes means for communicating with each of the active radars. Moreover, all the equipments associated with the CdC include means for exchanging information with it.

By means of these exchanges, the passive radar behaves for each of the active radars, as well as for the CdC, as a source of exogenous information providing complementary detection data. The provision of information and the type of information provided to an active radar varies here as a function of the requirements expressed by that active radar via requests transmitted to the passive radar.

According to the invention, the passive radar has two modes of operation:

a primary or "watching" mode in which the passive radar executes a surveillance mission over all its instrumented domain, which mission includes regular refreshing of its coverage domain; refreshing does not necessarily occur at a fixed timing rate, however;

an "on-demand data feed" mode in which, at the request of one or more active radars, the passive radar carries out analyses in sectors of interest defined by values of parameters of distance, speed and azimuth. Depending on the nature of the request, the analysis may be performed with different levels of details, different degrees of accuracy.

By default, in the absence of any particular demand coming from one or the other of the active radars of coalition, or from the CdC, the passive radar is in "watching" mode. For its part, the "on-demand data feed" mode is employed when requests are formulated and transmitted to the passive radar.

The times of switching from one mode to the other are functions of the nature and the urgency of the requests formulated. Moreover, the priorities of the various analysis tasks demanded by the active radars are managed as a function of the nature and the degree of priority assigned by the passive radar to those requests.

Thereafter the overall operation of the exchanges between the various elements of the architecture have the following features:

Each active radar of the coalition has permanent access to detection information produced by the passive radar when it is "watching" mode. This possibility is also offered to the CdC, which dialogs with the passive radar via a command and control and data collection link 15 represented in FIG. 1 by discontinuous line arrows. Each active radar 11 of the coalition that requests it then receives regularly the results of the surveillance effected by the passive radar 12. According to the invention, this exchange mode is defined so as not to demand afterwards any particular action of the passive radar 12 which is in this case is in the "watching" mode.

Access to the detection data generated by the passive radar 12 may advantageously enable an active radar to confirm certain tracks in a shorter time than if it did not have access to that information. Thus in the case of an active radar exercising only the watching function, access to this complementary detection data enables either track initialization or confirmation in the same rotation of the antenna as that for which the first detection was effected.

In an analogous manner, in the case of a multifunction radar, this access to complementary detection data enables confirmation of detection without having to employ confirmation pointing, which is time consuming.

The exchange protocol used between the passive radar 12 and the various active radars 11 of the coalition 13 concerned is defined so that each active radar of the coalition can, when necessary, transmit information requests asynchronously to the passive radar, these requests relating to the analysis of certain areas of interest, defined geographically, dynamically (speed aspect) and temporally.

For its part, the sequencing of the passive radar 12 is defined for optimum processing of requests transmitted to it by active radars. This processing is effected in the context of operation in "on-demand data feed" mode, in which the passive radar transmits the results of its analysis either to the active radar 11 that originated the request, for target search type requests, for example, or to the CdC 16, for example if it is a matter of a measurement simply intended to be merged at the center level to enhance tracking quality, or to both simultaneously.

To enable such operation, the various elements constituting the architecture of a coalition, the passive radar 12 and the active radars 11 include means configured to enable each element to have the use of a timebase common to all. This common timebase may be created, managed and distributed by the command center (CdC) 16, for example.

Moreover, the active radars are configured to be in a position to transmit requests with minimum notice, this notice guaranteeing that the passive radar will receive a request soon enough to be in a position to process that request in time. This notice takes account in particular of the capacities (data rate, response time) of the connection 14 between the active radar 11 and the passive radar 12. Moreover, each active radar is configured so that its sequencing takes into account the impact of this notice in the scheduling of the pointings executed, the pointing requests executed by a passive radar having to this end to be established as soon as possible and not to suffer too much time slippage.

According to the invention, the passive radar is configured for preferential operation in a continuous acquisition mode. As a result it is advantageously capable of continuously acquiring radar data in complex form (I and Q data), and, if necessary, transmitting it to units responsible for carrying out the processing.

Moreover, the detection data generated by the passive radar 12 being by nature data referenced within a bistatic frame of reference, each active radar 11 is provided with tracking means capable of integrating this bistatic data into the detection data generated by the active radar 11 itself, expressed in a cartesian frame of reference, generated by its own detection means. To this end the active radars 11 have the use of means for executing a tracking algorithm capable of processing delocalized bistatic data.

Again according to the invention, the requests sent by the active radars 11 to the passive radar 12 are of two kinds. Thus a distinction is drawn between search requests and analysis requests as such.

Search requests, as their name indicates, are intended for searching for new targets in a given region and in particular meeting given criteria of position and speed. The passive radar 12 satisfies these requests by transmitting to the active radar 11 authoring such a request all the bistatic detections effected in the area of interest and meeting the criteria. Detections may be transmitted in different forms, in raw form (bistatic plots generated by the various bistatic bases used by the passive radar), for example, or, if the targets are detected by a plurality of bistatic bases simultaneously, in the form of cartesian plots obtained by merging the bistatic plots generated by each of the bases.

Analysis requests are intended to collect particular information on a designated target. The passive radar 12 satisfies these requests by transmitting to the active radar 11 authoring such a request the values of the attributes of the bistatic detections associated with the designated target, to which Doppler attributes may be added if the passive radar 12 has the means and time available to perform a Doppler analysis.

Thereafter each search request transmitted by an active radar 11 includes information enabling the passive radar 12 to locate the area of interest. This information may for example consist in the position in the three dimensions of space of the center of the area of interest, expressed in a reference geographical frame of reference, associated with information defining the extent of the area around its center. It also includes information relating to the time for which the measurement should ideally be effected, this time being defined relative to the common time reference referred to above.

Each analysis request for its part includes information defining the position in the three dimensions in space of the target to be analyzed, accompanied by the uncertainty as to that position, as well as the time for which the measurement should ideally be carried out. It further includes information defining the list of particular attributes to be measured (Doppler spectrum, symmetrical lines, image, etc. as a function of the processing means and time available to the passive radar).

As stated above, the passive radar 12 as implemented in the architecture of the invention is configured to operate in two operating modes, a "watching" mode and an "on-demand data feed" mode. Depending on the computing power available to the passive radar 12, the latter is configured to use these two modes either alternately or simultaneously. Accordingly, when the available computation power allows it or when the number of requests is low, simultaneous use is preferred. Part of the computing power is then mobilized to maintain a certain timing for renewal of watching information, the rest of the computing power being used to process and satisfy external requests.

According to the invention, the watching mode of the passive radar 12 is a standard radar watching mode that is composed of three phases.

The first phase consists in periodically acquiring the signal received by the radar. This acquisition is effected over a time interval $T_{Coh}$ defined elsewhere.

The second phase consists in processing the received signal with the aim of detecting potential targets in the instrumented area defined by a distance interval, a speed interval. The detection phase gives rise in a manner known in the art to the generation of detection information taking the form of bistatic plots.

The optional third phase for its part consists in processing the detection data, the bistatic plots, locating the targets detected and determining the evolution (tracking function), the successive positions of a target being defined in a cartesian frame of reference centered on the passive radar.

Here these three phases are repeated indefinitely for as long as the watching mode is activated. However, they are not necessarily repeated regularly.

The detection information generated by the passive radar 12 when it is operating in a "watching" mode, bistatic plots or cartesian tracks, depending on the operating situation, may be transmitted to the command center (CdC), which processes it conjointly with the detection information transmitted by the active radar 11 or to the active radars 11 of the coalition 13 that requested this.

Figure 2:
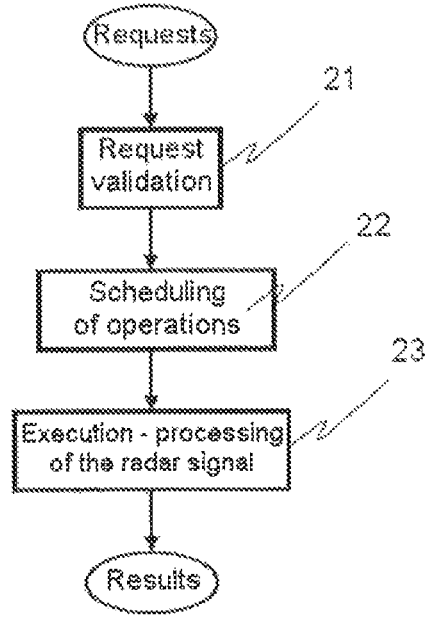
FIG. 2 is a block diagram showing the chaining of operations in "on-demand data feed" mode.

According to the invention, in the "on-demand data feed" mode of the passive radar 12, requests formulated by an active radar 11 are analyzed to optimize the sequencing of the passive radar 12, as shown in FIG. 2. The procedure for this is as follows.

The first step 21 is to set aside requests relating to areas of interest totally outside the coverage of the passive radar, these areas being determined for example from a detection probability calculation. In the same way, requests are detected that give too short a notice, given the requests already transmitted and possibly priorities associated with the various requests.

The list of the requests validated (i.e. not set aside) is then converted by the management unit of the passive radar into one or more passive processing requests, each request being characterized by the following parameters:

the integration time $T_{coh}$, adapted to the type of target and the required range, the start time $T_d$ of the analysis period. Optimizing the chaining of responses to requests transmitted by the various active radars has the object of determining, for the various requests, the analysis times enabling maximum satisfaction of a maximum number of requests. This optimization is carried out allowing for the coherent treatment time $T_{coh}$, the time $T_{proc}$ necessary for processing the data, and the available computation power.

the list of the bistatic areas of interest, constructed from requests to be satisfied during the time interval $T_{coh}$. Here each area is characterized by:
  a pointing direction,
  a "bistatic distance/bistatic speed" domain to be instrumented,
  a detection threshold,
  a set of transmitters to be used (according to the nature and the capacities of the deployed passive sensor).

Figure 3:
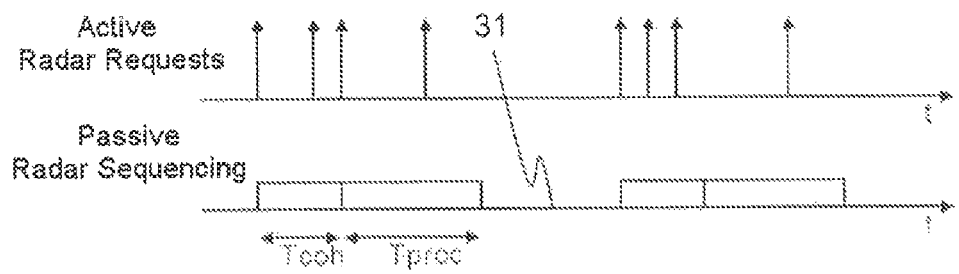
FIG. 3 illustrates the principle of time management of requests transmitted by the active radars.

Using these characteristics the passive radar management unit defines in step 22 the scheduling in time of the operations of executing the various validated requests, as the timing diagram 31 in FIG. 3 shows.

The passive radar 12 then proceeds in step 23 to processing the received signal according to the required tasks. Moreover, results corresponding to processing of the requests transmitted are transmitted to the active radars initiating these requests.

Note that where the mode of operation of the passive radar is concerned, in the context of the architecture of the invention, it is possible to imagine an alternative solution adapted to a passive radar having a high renewal timing rate, for which optimizing the scheduling of execution of the requests is simplified. In this case, there is no longer any need to optimize the analysis starting times to be in a position to satisfy all the "simple" analysis requests sent by the various active radars, only fine analysis requests necessitating optimization.

The invention claimed is:

1. A radar surveillance system of the type including a passive radar using opportunistic transmitters and a plurality of active radars that cooperate in the form of a coalition to assure the surveillance of an area of space, said passive radar being configured to adopt two alternate operating modes:
   a "watching" mode in which the passive radar carries out surveillance of the area of space concerned and generates detection information relating to objects in the area under surveillance, and
   an "on-demand data feed" mode in which the passive radar executes, based on a request from one or more active radars, an object search in a given sector of the area under surveillance or an analysis of certain characteristics of a signal received in a given sector defined by distance, speed and azimuth values, wherein data generated by the passive radar following the request is transmitted to the active radar or radars authoring that request.

2. The system of claim 1, wherein changing from the "watching" mode to the "on-demand data feed" mode is induced by the transmission of the request by one of the active radars and by the nature and the degree of priority of the request sent, the "watching" mode constituting a default operating mode of the passive radar in the absence of any request.

3. The system of claim 1, wherein the request transmitted by the active radar is analyzed to optimize the sequencing of the passive radar for optimal temporal scheduling of operations.

4. The system of claim 1, wherein each active radar determines, given an optimum time for execution of a task that is the subject of the request transmitted to the passive radar, the duration of the necessary notice that must accompany the transmission of the request so that the passive radar is able to execute the request at the optimum time, the duration of the notice taking into account the time necessary for transmitting the request given the nature of a data collection link between the passive radar and the active radar or radars making the request.

5. The system of claim 1, wherein all radars forming the system take into account a date and a time and a time reference that are common.

6. The system of claim 1, wherein the request is of two types:
   a search request, requesting a search by the passive radar for new targets in a given sector satisfying given position and speed criteria, and
   an analysis request, requesting measurement by the passive radar of particular magnitudes in a restricted spatial domain defined by a central position accompanied by an uncertainty on that position, as well as by an extent in the various directions in space;
   wherein the request is accompanied by the time for which the request must be carried out.

7. The system of claim 1, wherein the passive radar is configured, when operating in the "watching" mode, to transmit, to the active radars of the coalition, information generated from its detections.

8. A radar surveillance system comprising:
   a passive radar using opportunistic transmitters;
   a plurality of active radars that cooperate in the form of a coalition to assure the surveillance of an area of space, said passive radar operating in at least two alternate operating modes:
      a "watching" mode in which the passive radar carries out surveillance of the area of space concerned and generates detection information relating to objects in the area under surveillance, and
      an "on-demand data feed" mode in which the passive radar executes, based on a request from one or more of the plurality of active radars, (1) an object search in a given sector of the area under surveillance or (2) an analysis of certain characteristics of a signal received in a given sector defined by distance, speed and azimuth values, wherein data, generated by the passive radar following the request of one or more of the plurality of active radars, is transmitted to the active radar or radars authoring that request.

9. The system of claim 8, wherein changing from the "watching" mode to the "on-demand data feed" mode is induced by the transmission of the request by at least one of the plurality of active radars and by the nature and the degree of priority of the request sent, the "watching" mode constituting a default operating mode of the passive radar in the absence of any request.

10. The system of claim 8, wherein the request transmitted by at least one of the plurality of active radar is analyzed to optimize the sequencing of the passive radar for optimal temporal scheduling of operations.

11. The system of claim 8, wherein each active radar determines, given an optimum time for execution of a task that is the subject of the request transmitted to the passive radar, the duration of the necessary notice that must accompany the transmission of the request so that the passive radar is able to execute the request at the optimum time, the duration of the notice taking into account the time necessary for transmitting the request given the nature of a data collection link between the passive radar and the active radar or radars making the request.

12. The system of claim 8, wherein all radars forming the system take into account a date and a time and a time reference that are common.

13. The system of claim 8, wherein the request is:
   a search request, requesting a search by the passive radar for new targets in a given sector satisfying given position and speed criteria; or
   an analysis request, requesting measurement by the passive radar of particular magnitudes in a restricted spatial domain defined by a central position accompanied by an uncertainty on that position, as well as by an extent in the various directions in space,
   wherein the request is accompanied by the time for which the request must be carried out.

14. The system of claim 8, wherein the passive radar is configured, when operating in the "watching" mode, to transmit, to the active radars of the coalition, information generated from its detections.

15. A method of performing radar surveillance, in a system that comprises a passive radar that uses opportunistic transmitters and that comprises a plurality of active radar that cooperate in the form of a coalition to assure the surveillance of an area of space, the method comprising:

carrying out surveillance of the area of space by the passive radar and the passive radar generating detection information relating to objects in the area under surveillance;

receiving a request, at the passive radar from one or more of the plurality of active radars;

executing, at the passive radar based on the request: (1) an object search in a given sector of the area under surveillance or (2) an analysis of certain characteristics of a signal received in a given sector defined by distance, speed and azimuth values; and transmitting data, generated by the passive radar in response to the request, from the passive radar to the active radar or radars authoring the request.

16. The method of claim 15, wherein the carrying out surveillance is part of a "watch mode," wherein the executing is part of an "on-demand data feed mode," and further comprising:

changing from the "watching" mode to the "on-demand data feed" mode upon the passive radar receiving the request from one or more of the plurality of active radars and based on the nature and the degree of priority of the request sent, wherein the "watching" mode constitutes a default operating mode of the passive radar in the absence of any request.

17. The method of claim 15, wherein the request received by the passive radar is analyzed to optimize the sequencing of the passive radar for optimal temporal scheduling of operations.

18. The method of claim 15, further comprising: determining, at the active radar or radars authoring the request, given an optimum time for execution of a task that is the subject of the request, the duration of the necessary notice that must accompany the transmission of the request so that the passive radar is able to execute the task at the optimum time, the duration of the notice taking into account the time necessary for transmitting the request given the nature of a data collection link between the passive radar and the active radar or radars authoring the request.

19. The method of claim 15, wherein all radars forming the system take into account a date and a time and a time reference that are common.

20. The method of claim 15, wherein the request is one of at least two types:

a search request, requesting a search by the passive radar for new targets in a given sector satisfying given position and speed criteria, and an analysis request, requesting measurement by the passive radar of particular magnitudes in a restricted spatial domain defined by a central position accompanied by an uncertainty on that position, as well as by an extent in the various directions in space;

wherein the request is accompanied by the time for which the request must be carried out.

* * * * *